UNITED STATES PATENT OFFICE 2,629,664

STABILIZED AQUEOUS FATTY COMPOSITIONS

Betty M. Watts, Fayetteville, N. Y., and Henry V. Moss, Anniston, Ala., assignors to Syracuse University, Syracuse, N. Y., a corporation of New York No Drawing. Application November 19, 1949, Serial No. 128,492

15 Claims. (Cl. 99—163)

The present invention relates to aqueous fat systems, particularly complex foods containing both an aqueous and a fatty phase, and to a method of stabilizing such products against oxidative deterioration. It relates also to the products so stabilized.

Animal, vegetable, fish and like oils and fats are fatty acid glycerides and aqueous systems containing such materials as well as complex foods and pharmaceutical preparations presenting both an aqueous and a fatty phase are subject to oxidative deterioration which is accelerated by heat, light, various metals such as copper and iron, and other chemicals. This oxidative deterioration results in the formation of peroxides which eventually break down to aldehydes, ketones, peroxides and other oxidative degradation products. The undesirable effect of such oxidative deterioration is manifested by a disagreeable odor and taste imparted to the above glycerides and products containing same. This condition is generally referred to as rancidity, but as hereinafter pointed out, it may also and usually does involve other oxidative changes which precede rancidity.

For example, meats lose their pink color at an early stage of oxidation, usually before the fat becomes rancid. Moreover, frozen baked products develop off-odors and flavors before the fat gives a chemical test for rancidity. Furthermore, there is ample evidence of the partial or complete destruction of carotene, vitamins A, C and D, biotin and other nutrients early in the oxidative process. However, as these undesirable changes in appearance, palatability and nutritive value of the above products are associated with a very early stage of fat peroxidation, antioxidants which protect the fat usually retard the whole train of oxidative changes.

It is an object of the instant invention to substantially retard or inhibit the development of rancidity and the associated oxidative changes which occur in aqueous fat systems, pharmaceutical preparations and complex food products.

Another object of the invention is to substantially retard or inhibit oxidative deterioration of aqueous fat systems, complex foods and pharmaceutical products containing both an aqueous and a fatty phase.

Another object is to substantially retard or inhibit oxidative deterioration of aqueous fat systems, complex foods and pharmaceutical products in the presence or absence of metals such as copper, iron or their compounds which normally tend to accelerate oxidation and deterioration of the above materials.

Another object is to provide novel antioxidants which substantially retard or inhibit oxidative deterioration of aqueous systems including animal, vegetable, fish and/or like oils and fats as well as complex food products and pharmaceutical preparations containing such aqueous systems.

A further object is to provide as novel products aqueous fatty glyceride compositions, particularly complex foods and pharmaceutical products presenting both an aqueous and a fatty phase, stabilized against oxidative deterioration by the novel antioxidants of the instant invention.

A still further object is to provide a novel method of stabilizing aqueous fat systems, complex foods and pharmaceutical products of the above type against oxidative deterioration.

Other objects and advantages will be apparent to those skilled in the art as the description of the invention proceeds.

We have made the surprising discovery that normal molecularly dehydrated alkali phosphates are highly effective antioxidants for aqueous fatty glyceride systems and also complex food products and pharmaceutical preparations containing both an aqueous and a fatty phase. The phosphates employed as antioxidants in accordance with the present invention have the general formula $M_2O \cdot P_2O_5$, in which M is an alkali metal, particularly potassium and sodium, and in which the molar ratio of $M_2O$ to $P_2O_5$ is in the range of 1:1 to 1.9:1, and preferably in the range of 1:1 to 1.7:1. As illustrative of the preferred antioxidants within the above range of alkali phosphates may be mentioned potassium metaphosphate, sodium hexametaphosphate known as Graham's salt, sodium trimetaphosphate, Maddrell's salt, pentasodium triphosphate and nonasodium heptaphosphate; the invention, however, is not limited thereto as other normal molecularly dehydrated alkali metal phosphates and mixtures thereof having a molar ratio in the above broad range may be employed.

The normal molecularly dehydrated alkali phosphates referred to above are prepared by heating orthophosphoric acid compounds of sodium, potassium, etc. or suitable mixtures thereof to a temperature sufficient to effect molecular dehydration. Depending upon the alkali oxide/$P_2O_5$ molar ratio and the heatng and cooling conditions employed, the products thus obtained may be definite crystalline compounds, glasses or mixtures thereof. Thus, sodium hexametaphosphate is a glassy material; the other metaphosphates of sodium, namely sodium trimetaphosphate and Maddrell's salt, are respectively water soluble and water insoluble crystalline materials; and the remaining sodium phosphates within the above range are crystalline or glassy materials or mixtures thereof depending upon the above mentioned conditions. Further description of the molecularly dehydrated sodium phosphates or the other molecularly dehydrated alkali phosphates is deemed unnecessary since their properties and method of manufacture are well known.

For a more complete understanding of the present invention, reference is made to the hereinafter described method of evaluating the antioxidant effect of sodium phosphates and also to the following experimental data.

A 9 cm. filter paper (SS No. 589, black ribbon) was placed in a petri dish to absorb evenly 1.5 ml. of the aqueous solution to be tested. Melted lard (1.5 gm.) containing 0.01% added carotene was then weighed onto a second filter paper which was placed on top of the first. The fat penetrated rapidly throughout both papers, giving an even yellow color. Six drops of toluene were added to each dish as a preservative. The dishes were covered and placed on a rack in a tightly covered container with water in the bottom. When experiments lasted more than a few days the dishes were completely sealed with paraffin to prevent losses of moisture and preservative. The experiments were conducted in an air oven at 40° C., at which temperature the fat was completely melted.

Bleaching of the carotene served as an indication of the progress of oxidation and when on visual inspection the treated product was half bleached, it was considered rancid.

The results were recorded in terms of days required for the sample of treated product to be half bleached. The antioxidant index reported is the quotient obtained by dividing the number of days required for the sample containing the synergist to become rancid by the number of days required for the control to reach the same condition.

The carotene-lard mixture was prepared at the time of each experiment by combining 9 parts of pure lard with 1 part of a previously mixed carotene-lard concentrate. The concentrate was prepared from 1 part of crystalline carotene dissolved in chloroform to 1000 parts of lard. Where tocopherol was used, the pure alpha-tocopherol was dissolved directly in the carotene-lard.

Using the above procedure, experiments were carried out to illustrate the antioxidant effect of normal molecularly dehydrated sodium phosphates on lard and the results thereof are reported in Table I.

In performing these experiments, the sodium phosphates were incorporated in the two phase system of fat and water in an amount corresponding to 0.1% by weight and their stabilizing effect was determined by comparing the treated system with a control which consisted of the same system minus the additive, which system was maintained at a pH of 7.5 by a 0.01 molar buffer consisting of a mixture of monosodium and disodium phosphate.

In each case, 0.2% solutions of the sodium phosphates were prepared and the pH adjusted to 7.5 by the addition of HCl or NaOH, before dilution to the final concentration of 0.1%. No buffer was used in order to avoid complicating the results by the addition of other ions.

In some instances tocopherol and nordihydroguaiaretic acid, auxiliary antioxidants, were used with the sodium phosphates in 0.005% concentrations. This was done to compare the combined effects of the two antioxidants with the sum of their individual effects.

As indicated above, the results of the experiments are given below in Table I.

TABLE I

*Antioxidant effect of sodium phosphates at pH of 7.5 in lard*

| Antioxidant (0.1%) | Days to Turn Rancid | | | | |
| --- | --- | --- | --- | --- | --- |
| | Lard A | Lard A +0.005% Tocopherol | Lard B | Lard B +0.005% Tocopherol | Lard B +0.005% NDGA |
| Buffer Control | 1.5 | 6 | 3 | 6 | 26 |
| Sodium Trimetaphosphate | | 14 | | | |
| Pentasodium Triphosphate | 3 | | | | |
| Nonsodium Heptaphosphate | 7 | | | | |
| Hexametaphosphate | 15 | | 17 | 42 | >65 |
| Maddrell's Salt | 19 | 44 | 17 | 41 | >65 |

The above table demonstrates that the addition to lard of normal molecularly dehydrated sodium phosphates, alone or in combination with phenolic inhibitors, effects a substantial improvement in the ability of the lard to resist oxidation and also that the keeping time of the lard containing phenolic inhibitors and the above sodium phosphates is always considerably greater than the additive effect of these two materials separately, thus indicating the synergistic effect obtained by the combined use of the above antioxidants. It also shows that of the above phosphates Maddrell's salt and sodium hexametaphosphate have outstanding antioxidant properties.

Table I illustrates the antioxidant activity of normal molecularly dehydrated sodium phosphates in aqueous fat systems at a pH of 7.5 and in the absence of other ions. The effect of the latter is shown in the following Tables II and III wherein the aqueous fat systems containing sodium phosphates were maintained at a pH of 7.5 and 5.4 respectively by the addition of the buffers indicated.

TABLE II

*Antioxidant effect of sodium phosphate in sodium borate v. sodium orthophosphate buffers*

| Antioxidant (0.1%) | Days for Lard to Turn Rancid, pH 7.5 | |
| --- | --- | --- |
| | Borate Buffer, 0.01 Molar | Phosphate Buffer, 0.01 Molar |
| Buffer Control | 3 | 2 |
| Sodium Heptaphosphate | | 6 |
| Sodium Hexametaphosphate | 24 | 6 |
| Maddrell's Salt | 22 | 2 |

TABLE III

*Antioxidant effect of sodium phosphates at pH 5.4 on plain lard*

| Antioxidant (0.1%) | Days for Lard to Turn Rancid | |
|---|---|---|
| | Lard #2—Sodium Acetate Buffer, 0.01 Molar | Lard #2—Unbuffered |
| Control | 4 | 3.5 |
| Sodium Trimetaphosphate | 4 | |
| Sodium Triphosphate | 10 | 10 |
| Sodium Heptaphosphate | 13 | 17 |
| Sodium Hexametaphosphate | 11 | 21 |
| Maddrell's Salt | 4.5 | 19 |

Referring specifically to Table II and also to Table I, it will be noted that while the sodium phosphates protected the lard to about the same degree in 0.01 molar borate buffers (pH 7.5) and in unbuffered solutions at the same pH, orthophosphate buffers markedly interfered with the antioxidant effect of the above synergists and in the case of Maddrell's salt eliminated all antioxidant effect. Nevertheless, this does not imply that orthophosphates must always be absent from the product to be stabilized since even in their presence sodium hexametaphosphate and sodium heptaphosphate afforded substantial protection. Furthermore, the concentration of naturally contained orthophosphates in foods and pharmaceuticals would ordinarily be much lower than that used in the above experiment.

With reference to Table III, it will be observed that normal molecularly dehydrated sodium phosphates provided substantial protection to the unbuffered lard and with the two exceptions hereinafter referred to, the same was true of the buffered product. Thus, sodium trimetaphosphate displayed no antioxidant effect in the presence of a sodium acetate buffer, and Maddrell's salt provided little, if any, protection under this condition. Therefore, Table III shows that a high concentration of acetate must be avoided if the desired protection is to be obtained.

The experimental data presented in the following Tables IV and V illustrate the antioxidant activity of the sodium phosphate synergists of the present invention in the presence of minute amounts of metals such as copper and iron.

TABLE IV

*Effect of added copper on antioxidant activity of sodium phosphates at pH 7.5*

| Antioxidant (0.1%) | No Added Copper | | Added Copper, 3 p.p.m. | |
|---|---|---|---|---|
| | Days to Turn Rancid | Antioxidant Index [1] | Days to Turn Rancid | Antioxidant Index [1] |
| Control | 3 | | 0.8 | |
| Sodium Hexametaphosphate | 19 | 6.3 | 8 | 10 |
| Maddrell's Salt | 17 | 5.7 | 9 | 11.3 |

[1] This value corresponds to the ratio of the number of days for the synergist containing composition to become rancid to the number of days for the control to reach the same condition.

It will be noted from Table IV that the addition of 3 p. p. m. of copper in the form of copper sulfate to 0.1% solutions of the synergist caused the oxidation of the lard to be accelerated. None of the synergists eliminated the effect of the added copper, but the antioxidant indices obtained in the presence of copper were substantially higher than without the copper. This shows that the above sodium phosphates are highly satisfactory antioxidants even in the presence of oxidation promoters such as copper.

TABLE V

*Effect of added iron on antioxidant activity of sodium phosphates at pH 5.4*

| Antioxidant (0.1%) | No Added Iron | | Added Iron, 4 p.p.m. | |
|---|---|---|---|---|
| | Days to Turn Rancid | Antioxidant Index | Days to Turn Rancid | Antioxidant Index |
| Control | 4 | | 1.8 | |
| Sodium Hexametaphosphate | 20 | 5.00 | 12.0 | 7 |
| Maddrell's Salt | 21 | 5.25 | 9 | 5 |

The above table shows that, at a concentration of 4 p. p. m., iron had a pronounced accelerating effect on rancidity development. However, the antioxidant index for sodium hexametaphosphate was higher in the presence of added iron than without the iron; and under the same conditions, the antioxidant index was slightly lower for Maddrell's salt in the presence of added iron. These results show that the above synergists are effective antioxidants even in the presence of iron.

The foregoing description has been concerned primarily with demonstrating the protective action of the antioxidants of the present invention in aqueous systems including lard. However, the invention is not limited thereto as it is also applicable to aqueous systems including unsaturated fatty acids and/or animal, vegetable, fish and like oils and fats which are normally subject to oxidative deterioration.

For example, the antioxidants of the present invention may be advantageously used to inhibit or substantially retard oxidative deterioration of aqueous compositions including oleic acid, linoleic acid, linolenic and arachidonic and similar unsaturated fatty acids; aqueous compositions containing cottonseed oil, corn oil, peanut oil, sesame oil, soya bean oil, olive oil, cocoanut oil, palm kernel oil, natural butter, cocoa butter, shortening, tallow, oleo oil, cod liver oil, halibut liver oil, mackerel oil, herring oil, whale oil, edible oils, hydrogenated animal oils, hydrogenated vegetable oils, and hydrogenated fish oils; and complex food products containing both an aqueous phase and a fatty phase, such as bread, pie crusts, cooked or frozen meat products, fish, salad dressings, margarine, emulsified food products, fried foods such as potato chips and doughnuts, animal and poultry feed and numerous other food products.

In carrying the instant invention into execution, the normal molecularly dehydrated alkali metal phosphates may be incorporated and uniformly distributed in the above products in any suitable manner.

For example, one convenient method of incorporating finely divided solid alkali phosphates in solid fats is to mix the phosphates with liquefied fats in relatively high concentrations and then use this highly concentrated mixture in suitable amounts for protecting a larger batch of solid fats.

Moreover, the finely divided alkali phosphates may be added to dry curing compositions and applied by rubbing to the surface of hams, bacons and other meats. They may be premixed with seasoning or spices and then incorporated in prepared (cooked) meat products, fish, frozen meat products, potato chips, etc.; they may be mixed with leavening agents, baking powders and flours and the resulting product mixed with flour and/or water to produce bread, cake, pie crust and doughnut doughs.

Furthermore, the water soluble alkali phosphates may be dissolved in curing fluids and the latter introduced into or applied to the surface of hams, bacons and other meats in the customary manner. They may also be dissolved or dispersed in water or other media and blended or emulsified with the ingredients required to produce salad dressings and other emulsified foods; and they may be applied to solid whole chunks of meat to be canned by using a solution of the above phosphates as a cooking medium.

Finally, the alkali phosphates may be mixed with auxiliary antioxidants such as tocopherol, nordihydroguaiaretic acid, etc. and then incorporated in solid, solution or dispersed form with the above glycerides or glyceride-containing products.

The quantity of antioxidant required to inhibit or substantially retard oxidative deterioration of the above mentioned products depends upon the particular material selected for protection, the presence or absence of auxiliary antioxidants, the presence or absence of prooxidant metals, the type of container used to ship or store the above material and finally the stability requirements of the treated material. For most purposes, about 0.1% to about 0.2% by weight of the antioxidant is sufficient, but it is within the scope of the invention to employ this material in an amount varying within the range of about 0.005% to about 1% by weight.

As many widely different embodiments of this invention may be made without departing from the spirit and scope thereof, it is to be understood that we do not limit ourselves to the specific embodiments thereof except as defined in the appended claims.

We claim:

1. A composition of matter comprising an aqueous phase and a fatty phase and as an antioxidant therefor about 0.005% to about 1% by weight of a mixture of a phenolic antioxidant and a normal molecularly dehydrated alkali phosphate having the formula $M_2O \cdot P_2O_5$ in which M is an alkali metal selected from the group consisting of sodium and potassium and the molar ratio of $M_2O$ to $P_2O_5$ is in the range of 1:1 to 1.7:1.

2. A composition of matter comprising an aqueous phase and a fatty phase and as an antioxidant therefor about 0.1% and about 0.005% by weight of sodium trimetaphosphate and tocopherol, respectively.

3. A composition of matter comprising an aqueous phase and a fatty phase and as an antioxidant therefor about 0.1% and about 0.005% by weight of sodium hexametaphosphate and nordihydroguaiaretic acid, respectively.

4. A composition of matter comprising an aqueous phase and a fatty phase and as an antioxidant therefor about 0.1% and about 0.005% by weight of Maddrell's salt and nordihydroguaiaretic acid, respectively.

5. A composition of matter comprising an aqueous phase and a fatty phase in the form of lard and as an antioxidant therefor about 0.1% and about 0.005% by weight of sodium trimetaphosphate and tocopherol, respectively.

6. A composition of matter comprising an aqueous phase and a fatty phase in the form of lard and as an antioxidant therefor about 0.1% and about 0.005% by weight of sodium hexametaphosphate and nordihydroguaiaretic acid, respectively.

7. A composition of matter comprising an aqueous phase and a fatty phase in the form of lard and as an antioxidant therefor about 0.1% and about 0.005% by weight of Maddrell's salt and nordihydroguaiaretic acid, respectively.

8. A prepared meat product comprising an aqueous phase and a fatty phase and as an antioxidant therefor about 0.005% to about 1% by weight of a mixture of normal molecularly dehydrated sodium phosphate having a $Na_2O/P_2O_5$ molar ratio in the range of 1:1 to 1.7:1 and a phenolic antioxidant.

9. A salad dressing comprising an aqueous phase and an edible fatty phase and as an antioxidant therefor about 0.005% to about 1% by weight of a mixture of normal molecularly dehydrated sodium phosphate having a $Na_2O/P_2O_5$ molar ratio in the range of 1:1 to 1.7:1 and a phenolic antioxidant.

10. A baked flour product comprising an aqueous phase and an edible fatty phase and as an antioxidant therefor about 0.005% to about 1% by weight of a mixture of a normal molecularly dehydrated sodium phosphate having a $$Na_2O/P_2O_5$$

molar ratio in the range of 1:1 to 1.7:1 and a phenolic antioxidant.

11. A composition of matter comprising an aqueous phase and a fatty phase in the form of lard and as an antioxidant therefor about 0.1% by weight of a mixture of sodium hexametaphosphate and a phenolic antioxidant.

12. A composition of matter comprising an aqueous phase and a fatty phase in the form of lard and as an antioxidant therefor about 0.1% by weight of a mixture of Maddrell's salt and a phenolic antioxidant.

13. A composition of matter comprising an aqueous phase and a fatty phase in the form of lard and as an antioxidant therefor about 0.1% by weight of a mixture of nonasodium heptaphosphate and a phenolic antioxidant.

14. A composition of matter comprising an aqueous phase and a fatty phase in the form of lard and as antioxidants therefor about 0.1% and about 0.005% by weight of Maddrell's salt and tocopherol respectively.

15. A composition of matter comprising an aqueous phase and a fatty phase in the form of lard and as antioxidants therefor about 0.1% and about 0.005% by weight of sodium hexametaphosphate and tocopherol respectively.

BETTY M. WATTS.
HENRY V. MOSS.

REFERENCES CITED

The following references are of record in the file of this patent:

UNITED STATES PATENTS

| Number | Name | Date |
|---|---|---|
| 1,982,907 | Eckey | Dec. 4, 1934 |
| 1,993,152 | Eckey | Mar. 5, 1935 |
| 2,513,094 | Hall | June 27, 1950 |